United States Patent [19]
Golden et al.

[11] 3,894,790
[45] July 15, 1975

[54] 360° VIEWABLE REFLECTORIZED VEHICLE

[75] Inventors: Gerald Golden, Franklin Park; James D. Kennedy, Streamwood, both of Ill.

[73] Assignee: Beatrice Foods Company, Elgin, Ill.

[22] Filed: Feb. 19, 1974

[21] Appl. No.: 443,508

Related U.S. Application Data

[63] Continuation-in-part of Ser. No. 355,796, April 30, 1973, abandoned.

[52] U.S. Cl. .................... 350/99; 350/97; 350/103
[51] Int. Cl.² ........................................ G02B 5/12
[58] Field of Search ............... 350/288, 299, 97–109

[56] References Cited
UNITED STATES PATENTS

| | | | |
|---|---|---|---|
| 2,344,542 | 3/1944 | Fike | 350/99 |
| 3,541,606 | 11/1970 | Heenan et al | 350/103 |

*Primary Examiner*—Robert J. Corcoran
*Assistant Examiner*—Michael J. Tokar
*Attorney, Agent, or Firm*—Hill, Gross, Simpson, Van Santen, Steadman, Chiara & Simpson

[57] ABSTRACT

An improved 360° viewable reflector system for a two wheel cycle type vehicle or the like. The system employs six reflectors, each reflector having both standard reflective areas and wide-angle reflective areas and being adapted to retroreflect light over an included angle of at least about ± 50° in one plane relative to a perpendicular to such reflector in such plane. These reflectors are amber or white and red in color. The reflectors are mounted on a bicycle or the like to provide 360° coverage, yet provide a color differential between front and rear thereof. This system satisfies and meets all known Federal bicycle reflector regulations.

4 Claims, 13 Drawing Figures

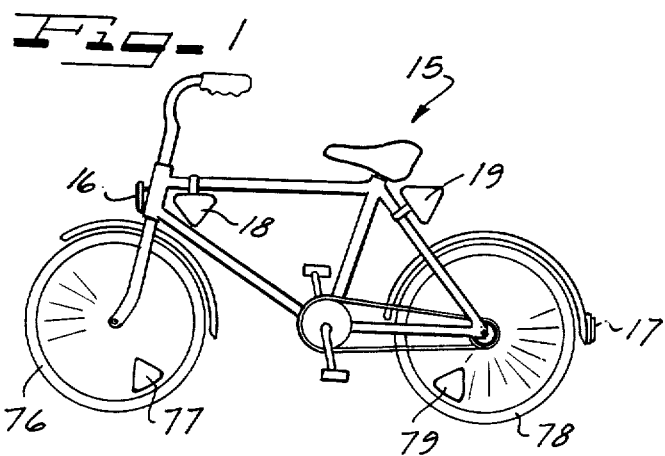
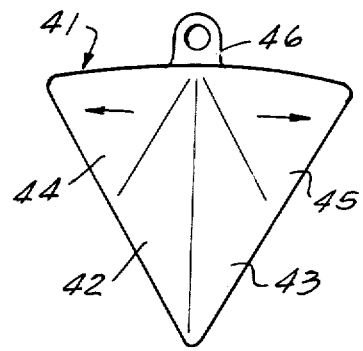
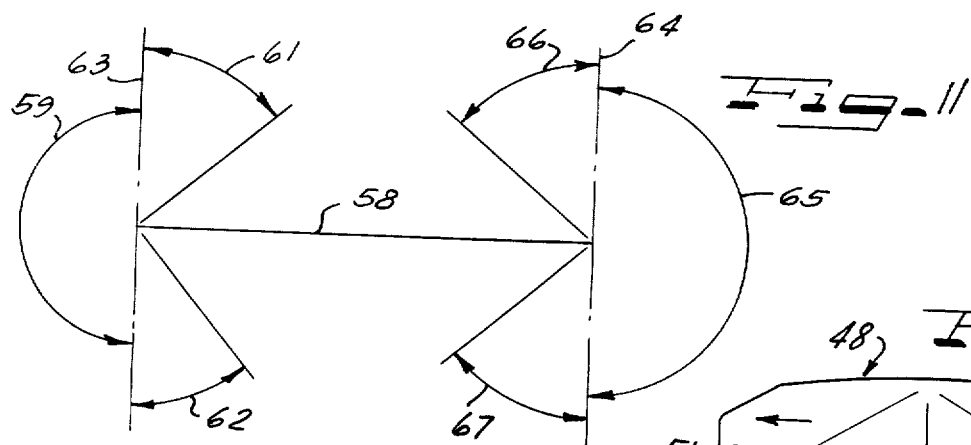
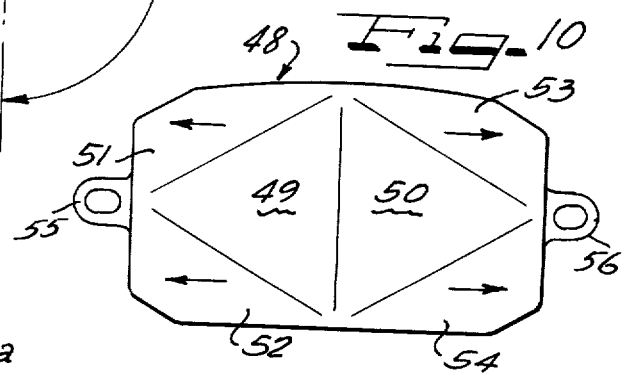
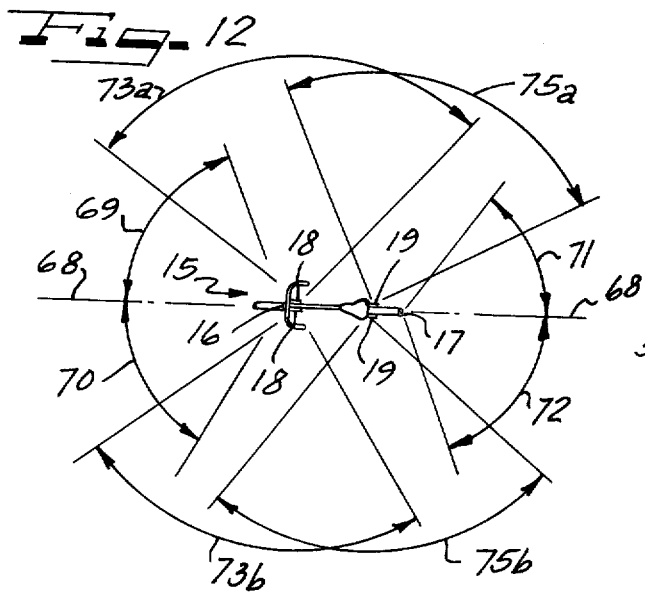
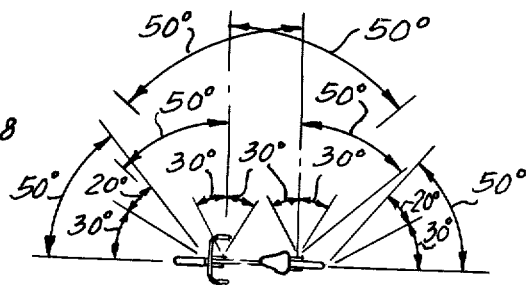

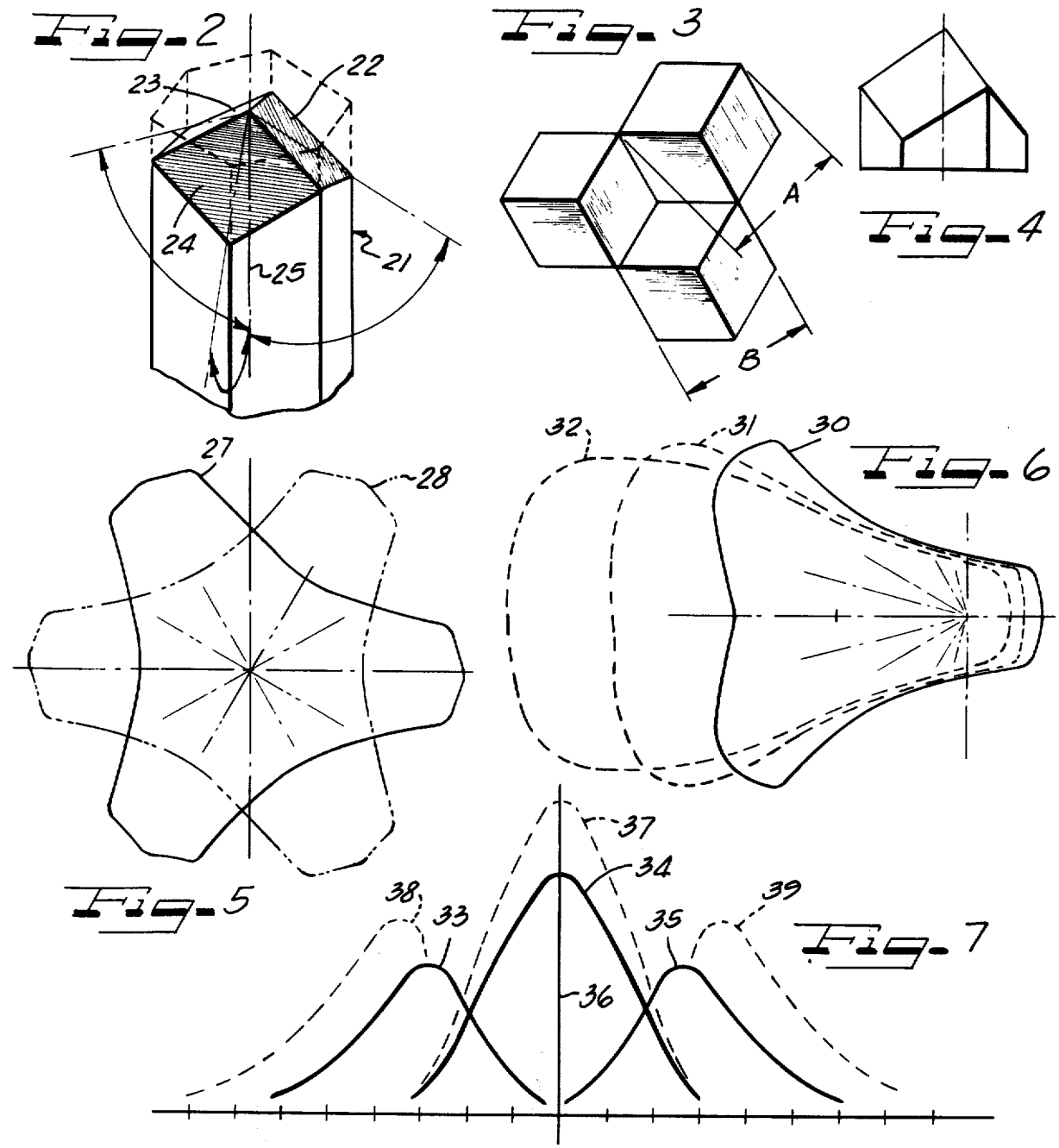

1

360° VIEWABLE REFLECTORIZED VEHICLE

RELATED APPLICATION

This application is a continuation-in-part of our earlier U.S. application Ser. No. 355,796, filed Apr. 30, 1973, now abandoned.

BACKGROUND OF THE INVENTION

In order to produce a reflex reflective system for a bicycle or the like which is adapted to retroreflect light through 360° circumferentially extending about the bicycle, the prior art previously had to employ a plurality of different reflectors positioned at various locations about the bicycle. Because of governmental regulations affecting the color of light reflected from different locations on a bicycle, sometimes as many as twelve or even more reflectors were needed to accomplish such 360° coverage.

Recently, governmental authorities have become aware that assemblies of wide-angle and standard retroreflective surfaces can be incorporated into a single reflector body and governmental regulations have established that such reflectors be retroreflective over angles of about ± 50° measured in one plane relative to a perpendicular to the face of such a reflector body in such plane.

BRIEF SUMMARY OF THE INVENTION

The present invention is directed to an improved 360° viewable reflector system involving a combination of a two wheel vehicle of the cycle type with six reflector bodies, each such body being adapted to retroreflect incident light over an angle ranging from at least about ± 50° with respect to a vertical thereto in one plane. The reflector bodies are colored and arranged so that the front of the vehicle is distinguishable from the back or rear of the vehicle at any given point within a 360° circumferential region about the vehicle. These bodies are amber, white or ret in hue of retroreflected light.

It is an object of this invention to overcome the disadvantages of the prior art which requires the use of multiple single reflector units in order to obtain 360° retroreflection circumferentially around a vehicle, particularly in order to meet governmental regulations covering reflected color.

An object of this invention is to provide a reflector system for a bicycle which provides a 360° coverage about a bicycle and which employs wide-angle reflector areas in combination with standard reflector areas in single reflector bodies and also provides a reflected light color differential between front and rear thereof.

Another object of this invention is to provide a reflector system of the type indicated which uses a minimum number of similarly constructed reflectors and which still is adapted to meet various governmental regulations and standards for reflectorizing bicycles.

Other and further objects, purposes, features, aims, advantages and utilities will be apparent to those skilled in the art in a reading of the present specification, drawings and claims.

BRIEF DESCRIPTION OF THE DRAWINGS

In the Drawings:

FIG. 1 is a side elevational view of a bicycle equipped with retroreflective reflectors of the type, and in the manner, taught by the present invention;

2

FIG. 2 is an enlarged isometric view of one embodiment of a pin used in the manufacture of a retroreflective reflector;

FIG. 3 is a top plan view of the type of hexagonal pattern produced when a plurality of the pins of FIG. 2 are grouped together;

FIG. 4 is a side elevational view of one cube corner in a molded transparent retroreflective reflector body made from a mold which is formed using the pins of FIGS. 2 and 3;

FIG. 5 shows plots of the characteristic retroreflected light patterns produced by a plurality of facets in a body of the type shown in FIG. 4;

FIG. 6 is a series of plots illustrating the manner in which the field of reflected light patterns change in a molded transparent reflector body as the axis of the pins employed are angled from a vertical position to a position inclined to the vertical;

FIG. 7 shows illistrative plots of intensity versus incident light for a reflector of the type having both standard reflector facets and wide-angle reflector facets;

FIG. 8 is a plot illustrating one relationship between angle of reflected light and intensity of reflected light at such angle both horizontally and vertically for a combination of wide-angle and standard reflectors in a single reflector body;

FIG. 9 illustrates a top plan view of one embodiment of the type of reflector assembly adapted for use in the system of the present invention;

FIG. 10 is a view similar to FIG. 9 but showing an alternative embodiment;

FIG. 11 is a diagrammatic view illustrating government regulations relating to the reflectorization of a bicycle;

FIG. 12 is a plan view of the bicycle of FIG. 1; and

FIG. 13 is a view similar to FIG. 12 but showing angular interrelationships between the various reflector areas in the embodiment of FIGS. 1 and 12.

DETAILED DESCRIPTION

Referring to FIG. 1 there is seen a bicycle designated in its entirety by the numeral 15 which is equipped with six reflectors in accord with the teachings of the present invention, namely, a front reflector 16, a rear reflector 17, a pair of forwardly located side reflectors 18 mounted back-to-back, and a pair of rearwardly located side reflectors 19 also mounted back-to-back.

Constructionally, front reflector 16, rear reflector 17, forward side reflectors 18 (paired) and rearward side reflectors 19 (paired) are similarly constructed one to another.

The relationship between a group of facets in a conventional so-called standard retroreflective reflector (which, characteristically is considered to be adapted to retroreflect impinging incident light over angles of about ± 30° usually horizontally) and a group of facets in conventional so-called wide-angle retroreflective reflector (which, characteristically, is considered to be adapted to retroreflect impinging incident light over angles ranging from not less than about 30° of up to at least about 45° in one direction, usually horizontally) is illustrated by FIGS. 2 through 8. In the manufacture of retroreflective reflector elements of such conventional types, which are incorporated into the systems of the present invention, a plurality of so-called pins 21 may be employed. Each pin 21, as shown here, is hexagonally shaped. The transverse distance between pin 21 flat sides is variable, but is typically of the order of about 0.094 inches while the distance between opposing edges is also variable, but is typically of the order of about 0.108 inches. Three facets 22, 23, and 24 are formed at the forward end of each pin 21. Each facet 22, 23, and 24 traverses two sides of the hexagonal pin 21 and has an apex coinciding with the axis 25 of each pin 21. Each facet 22, 23, and 24 has an angle relative to the axis 25 of about 35¼ degrees.

To make a reflector, a plurality of pins 21 are arranged with their respective faceted heads grouped into a pattern, such as shown, for example, in FIG. 3, and an electroform mold, or the like, is made therefrom, as indicated above, using such pin pattern. An electroform mold is currently, as indicated, made by electroplating nickel or the like onto and over a plurality of such a pin pattern. In such process, the high points and the low points, respectively, over such a group of pins 21 are reversed in mirror image fashion in the product electroform mold over their respective positions in the pin 21 pattern, as those skilled in the art will appreciate. From the product mold, a transparent, plastic reflector element is moldable. A section through one molded facet in a resulting reflector so made is shown, for example, in FIG. 4.

When such a reflector body having such a plurality of individual facets, such as shown, for example, in FIG. 3, is caused to retroreflect incident light, a characteristic plot of reflectance angle versus light intensity results, such as illustrated by the solid line 27 in polar coordinate plot shown in FIG. 5. If one rotates the pins 21 of FIG. 3 through 180° and makes a mold, and then a reflector, such reflector has a pattern of reflected light as shown by the dotted line 28 of FIG. 5. However, when one tilts the axis 25 of each pin 21 of a plurality thereof arranged in a pattern, such as shown, for example, in FIG. 6, from the vertical position shown in FIGS. 3 through 5 through increasing angles of common inclination relative to pin axes 25, there is produced a family of characteristic plots of reflectance angles versus light intensity, such as shown in FIG. 6, each succeeding plot 30, 31, and 32 representing a greater common inclination angle for each of a group of such pins 21, which are electroformed into a mold, and then the mold used to make a reflector body. When one tilts the respective axes 25 of such a plurality of such pins 21 in the opposite direction, there is then produced a changing family of characteristic curves (not shown) like those in FIG. 6, but reversed by 180°. The plots in FIGS. 5 and 6 are not for any specific reflectors, but are given herein to illustrate the known principles involved.

When one combines into a single reflector body both the type of reflex reflectance shown in FIG. 5 with the type shown in FIG. 6, there is produced in a single reflector body both such types of reflex reflectance. The reflector area shown in FIG. 5 is sometimes known as "standard" reflectance, which has a characteristic maximum reflectance value generally at 0° and which retroreflects incident light over an angle of about ± 30° on either side of a vertical or perpendicular thereto. The reflector area shown in FIG. 6 is sometimes known as "wide-angle" reflectance, which has a characteristic maximum reflectance value which can range very widely such as from about 10° to 88°, on one side of a perpendicular thereto, though values between about 25° and 70° are particularly and preferably useful. Such a reflector area, as shown in FIG. 6, retroreflects incident light through extreme angles on one side of a vertical thereto, typically from about 8° to 88°, though values between about 30° and 50° are currently commercially particularly and preferably useful. To achieve horizontal side viewability in both left and right directions, of course, two different groupings of preferably identical wide-angle facets are commonly used, one group having pin axes reversed relative to the other.

A combination reflector body including both standard and wide-angle reflectance displays a characteristic plot of retroreflectance angle versus reflected light intensity, as shown, for example, in FIG. 7 by illustrative curves 33, 34, and 35 wherein the curve 34 is produced by a combination of both of the so-called standard retroreflective facets of FIG. 5, the curve 33 is produced by the so-called wide-angle retroreflective facets sensitive to light on the left side of the ordinate 36 (such as in FIG. 6), and the curve 35 is produced by the so-called wide-angle retroreflective facets sensitive to light on the right side of the ordinate 36. If, for example, the number of standard facets in a given reflector is increased, the amount of reflected light therefrom increases, and there is produced a reflectance curve, such as, for example, the dotted curve 37. If, for example, both the number of wide-angle facets and their respective angles of inclination are increased equally for both right and left hand members, the type of dotted reflectance curves 38 and 39, respectively, result. For example, current U.S. Federal government standards for a bicycle reflector comprising such a combination of left and right wide-angle reflector facets in further combination with standard reflector facets are illustrated in FIG. 8 where, for each degree of reflectance horizontally or vertically measured, the corresponding intensity in candlepower per foot candle of reflected light is indicated. By combining different pin 21 groupings at different respective facet axis 25 angles, as those skilled in the art will appreciate, one can produce an almost unlimited gradation of retroreflectance characteristics in a given retroreflector, so that any given desired reflector or set of reflectance characteristics can be produced in a given reflector by one skilled in the art within the limitations of pins, materials of construction, design standards, and the like, using known technology.

In FIG. 9 is seen a reflector assembly 41 containing two areas 42 and 43 of standard retroreflective facets, one such area being adapted to provide a reflectance pattern similar to, say, curve 27 of FIG. 5; the other such area being adapted to produce a curve of retroreflectance similar to curve 28 of FIG. 5. Reflector assembly 41 is further equipped with two wide-angle retroreflective areas 44 and 45, respectively. The area 44 is adapted to produce a reflected light pattern having an intensity as demonstrated, for example, by curve 33 of FIG. 7 while area 45 is adapted to produce a curve of intensity similar to that shown by curve 35 of FIG. 7. The reflector assembly 41 is provided with an ear 46 which adapts the reflector assembly for mounting by any one of a variety of conventional type clamping means to a two wheeled vehicle. Thus, the reflector 41 is adapted to be used in a manner of reflectors 18 or 19 on the bicycle 15 of FIG. 1.

Another reflector assembly 48 is shown in FIG. 10 which has a different configuration from the reflector assembly 41. Similarly to the reflector 41, the reflector assembly 48 has two standard areas of retroreflectivity 49 and 50 (analogous to areas 42 and 43, respectively), but in the reflector 48 there are four wide-angle areas 51, 52, 53 and 54, respectively, the areas 51 and 52 corresponding to area 44 but involving a larger total region of side reflectance than the area 44, and similarly areas 53 and 54 corresponding to area 45 but involving a larger total region than the area 45, thereby in each instance improving the side retroreflectivity characteristics of the reflector of FIG. 9. Thus, the areas 49 and 50 can be assumed to produce a curve 37 such as shown in FIG. 7, the areas 51 and 52, a curve such as 38 in FIG. 7, and the areas 53 and 54 produce a curve such as 39 in FIG. 7. Reflector 48 is equipped with a pair of ears 55 and 56.

In FIG. 11 is illustrated the type of reflector coverage for a bicycle type vehicle required in recent Federal regulations. Thus, with respect to the center, vertical plane 58 of a bicycle (not shown), the 180° angular region 59 extending transversely across the front of the bicycle is to be coverable with retroreflected light from a retroreflector means located across plane 58 so that a viewer remotely situated circumferentially and horizontally with respect to the frontal region of the bicycle views an amber or white (clear) retroreflected light. In addition, through horizontally and circumferentially extending angles 61 and 62 opening sidewards from a perpendicular 63 which extends transversely through the center plane 58 across the front region of the bicycle, amber or white (clear) colored retroreflected light is to be producable. Each angle 61 and 62 is 50° approximately.

A similar situation with respect to reflector coverage prevails across the rear region of a bicycle. Thus, transversely across the rear of the bicycle with respect to center plane 58, the 180° angular region 65 is to be coverable with retroreflected light from a retroreflector means located across plane 58 so that a viewer remotely situated circumferentially and horizontally with respect to the rear region of the bicycle, views a red retroreflected light. In addition, through horizontally and circumferentially extending angles 66 and 67 opening sidewards from a perpendicular 64 which extends transversely through center plane 58 across the rear of the bicycle, red or clear colored retroreflected light is to be producable. Each angle 66 and 67 is 50° approximately.

At a position remote from the center plane 58 on either side of the bicycle, the angles 61 and 66 and 62 and 67, respectively, intersect. A viewer remotely located along either side of a bicycle so equipped can thus "see" both angles 61 and 66, or angles 62 and 67, as the case may be. By using red at the rear, and amber or white at the front, for example, of the bicycle, a viewer can immediately orient the bicycles position relative to himself wheresoever he is located in a 360° circumferential area about the bicycle, and the general direction, and even the speed and the distance of the bicycle relative to such viewer, can be judged.

As indicated, the present invention employs at least six reflectors mounted around a bicycle. Each such reflector has the capability of retroreflecting through an angle of at least about ± 50° measured along one direction on either side of a perpendicular thereto. Thus, for example, front reflector 16 (referring to FIGS. 1, 12 and 13) relative to the center plane 68 of bicycle 15 retroreflects light through an angle 69 of at least about 50° to the right of the center plane 68 and through an angle 70 of at least about 50° to the left of center plane 68. The standard retroreflective surfaces in reflector 16 account for retroreflection over an angle of about ± 30° on either horizontal side of plane 68, and the wide-angle areas in the reflector 16 provide retroreflection in the respective regions of from at least about 30° to at least about 50° (or at least about 20°) on each horizontal side of the plane 88 to provide the desired angular retroreflectable light coverage making up the respective angles 69 and 70.

Similarly, the retroreflected light from rear reflector 17 covers the respective angles 71 and 72 on either side of the center plane 68. Each angle 71 and 72 involves at least about 50° of retroreflected light. Reflector 17 is red in color of retroreflected light while that of reflector 16 is either amber or white in color.

Similarly, each of the two reflectors 18 mounted back-to-back provides retroreflective light coverage of at least about 50°, one reflector 18 providing coverage through an angle 73a on one side of the center plane 68, and the other reflector 18 providing retroreflected light on the other side of the center plane 18 through an angle 73b. Similarly, the reflectors 19, respectively, provide retroreflected light through an angle of 75a of at least about 50° on one side of the center plane 68, while the other reflector 19 provides retroreflected light through an angle 75b of at least about 50° on the other or opposed side of center plane 68. The various light patterns generated by each of the standard areas and wide-angle areas and the respective reflectors employed in the embodiment of FIGS. 1, 12 and 13 are detailed in FIG. 13.

In one preferred mode of practicing this invention the two reflectors 18 may be mounted back-to-back on either side of the front wheel 76, as shown by the dotted reflectors 77 in FIG. 1, and the two reflectors 19 may be mounted back-to-back on either side of the rear wheel 78, as shown by the dotted reflectors 79. Other mounting arrangements besides back-to-back may be employed.

Preferably in the practice of this invention, the respective colors of the individual six reflectors employed is always such that a viewer can judge vehicle spatial variables by retroreflected light. In one more preferred arrangement reflectors 16 and 18 are amber, and the reflectors 17 and 19 are red. In another more preferred arrangement reflectors 16, 18 and 19 are clear or white and reflector 17 is red. Reflector colors can be chosen from the following Table I.

TABLE I

| Reflector Color | Reflector Location |
|---|---|
| White | Front |
| Amber | Front |
| Red | Rear |
| White | Either side adjacent front |
| Amber | Either side adjacent front |
| Clear | Either side adjacent rear |
| Red | Either side adjacent rear |

Those skilled in the art will appreciate that more than six reflectors of the type employed in the practice of the present invention may be mounted upon a bicycle or like vehicle as desired but only the six reflectors as taught by this invention, are needed in order to achieve the desired 360° retroreflection circumferentially around a bicycle or like vehicle while simultaneously generating the desired differential pattern of light which permits vehicle orientation by a viewer.

Those skilled in the art will further appreciate that, as illustrated particularly in reference to FIGS. 6 and 7, the wide-angle areas need not be limited to coverage in a region of merely ± 20° between 30° and 50° on each side of a mounted reflector used in this invention. A wide-angle reflector characteristically has the capability of retroreflecting light effectively through angles as small as 10° up to angles as great as about 80°. However, the region from about 25° to 55° can be considered by those skilled in the art as being a most efficient region of wide-angle retro-reflection (measured with respect to a vertical to such a reflector).

Any convenient means of mounting the six reflectors, respectively, to a vehicle may be employed. However, it is a special feature of the present invention that the side mounted reflectors may be mounted back-to-back which simplifies mounting and minimizes the costs of the components involved, a fact which can be important not only in the manufacture of the reflectors but also from the standpoint of the cost of the reflectors to an individual bike owner.

Other and further embodiments and variations of the present invention will become apparent to those skilled in the art from a reading of the present specification taken together with the drawings and no undue limitations are to be inferred or implied from the present disclosure.

We claim:

1. A reflectorized two wheel vehicle comprising:
   A. a vehicle including frame means supported by, and operated by using two longitudinally spaced spoked wheels,
   B. six retroreflective reflector assemblies each characterized by having,
      1. a one-piece molded reflective body having a generally smooth, flattened front face with facets molded into spaced, parallelly extending rear face,
      2. each body having at least three reflective areas of facets formed integrally into the said rear face,
         a. one such area being adapted to retroreflect incident light striking said face up to an angle of 30° on each of a chosen pair of opposed sides of a vertical to said face,
         b. a second such area being adapted to retroreflect incident light striking said face within an angle from not less than about 30° up to at least about 50° on one of said chosen sides, and
         c. a third such area being adapted to retroreflect incident light striking said face within an angle ranging from not less than about 30° up to at least about 50° on the other,
   C. mounting means for each of said reflector assemblies,
   D. one said reflector assembly being mounted transversely across a front portion of said vehicle in a stationary position relative to said frame means with said front face thereof forwardly unobstructed,
   E. one said reflector assembly being mounted transversely across a rear portion of said vehicle in a stationary position relative to said frame means with said front face thereof rearwardly unobstructed, and
   F. two of said reflector assemblies being mounted longitudinally in a spaced, back-to-back relationship upon side portions of each of said wheels with said respective opposed front faces of each two thereof on each wheel being sidewardly substantially unobstructed.

2. The vehicle of claim 1 wherein said front transverse reflector and said forward longitudinal reflectors are either amber or white in color.

3. The vehicle of claim 1 wherein said rear transverse reflector is red in color.

4. The vehicle of claim 1 wherein each one of said two pairs of longitudinal reflectors is mounted with said respective rear faces thereon being in opposed relationship to each other.

* * * * *

UNITED STATES PATENT OFFICE
CERTIFICATE OF CORRECTION

Patent No. 3,894,790           Dated July 15, 1975

Inventor(s) Gerald Golden et al

It is certified that error appears in the above-identified patent and that said Letters Patent are hereby corrected as shown below:

Column 1, line 39, change "ret" to -- red --.

Signed and Sealed this third Day of February 1976

[SEAL]

Attest:

RUTH C. MASON
*Attesting Officer*

C. MARSHALL DANN
*Commissioner of Patents and Trademarks*